H. H. Hawes,

Dough Kneader.

No. 112,707. Patented Mar. 14, 1871.

Witnesses.
Chas. Kenyon
Villette Anderson

Inventor.
H. H. Hawes,
Chipman, Hosmer & Co
Attys

United States Patent Office.

HERBERT HENRY HAWES, OF MOUNT MERIDIAN, VIRGINIA.

Letters Patent No. 112,707, dated March 14, 1871.

IMPROVEMENT IN DOUGH-KNEADERS.

The Schedule referred to in these Letters Patent and making part of the same.

*To all whom it may concern:*

Be it known that I, HERBERT HENRY HAWES, of Mount Meridian, in the county of Augusta and State of Virginia, have invented a new and valuable Improvement in Dough-Kneaders; and do hereby declare that the following is a full, clear, and exact description of the construction and operation of the same, reference being had to the annexed drawing making a part of this specification and to the letters and figures of reference marked thereon.

Figure 1 of the drawing is a representation of my invention in top view.

Figure 1:
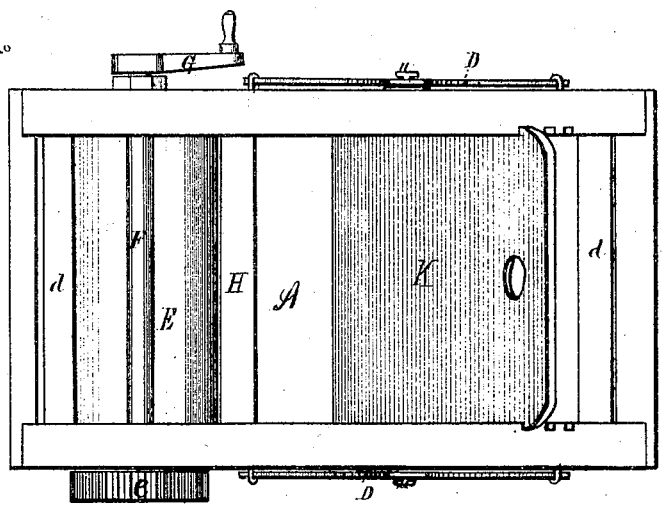
Figure 2:
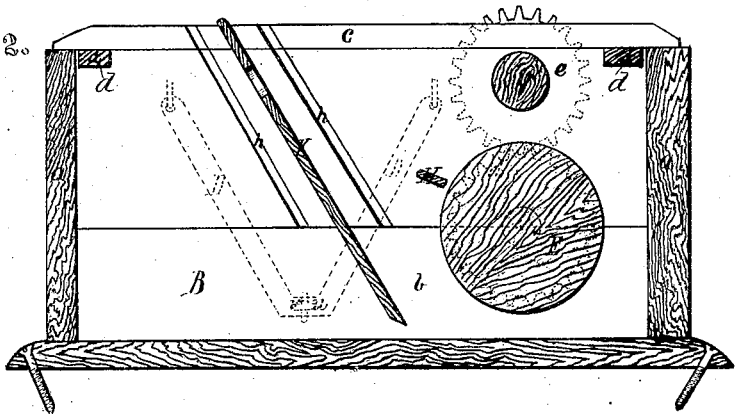
Figure 2 is a central vertical section of the same.
Figure 3:
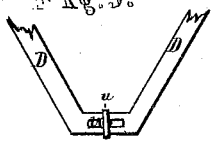
Figure 3 is a detached view, showing the hasp.

My invention has relation to an improvement in means for kneading dough; and

It consists in the construction and novel arrangement of devices whereby a large or small mass of dough may be worked and kneaded thoroughly, rapidly, and with small expenditure of labor, as hereinafter shown and described.

The letter A of the drawing designates the box or receiver, into which the flour and water, mixed or unmixed, may be placed.

This box consists of two parts—a lower box, B, provided with four vertical walls, of which the two end walls $a$ are the full height of the receiver A, and the two side walls $b$ are about half this height; and an upper frame, C, consisting of two parallel boards, $c$, connected by cross-ties, $d$, and serving to complete the full height of the side walls $b$ of the box B.

These two portions B and C are connected together by a V-shaped hasp, D, which is secured, by staples passing through its upper ends, to the sides of the frame C, and to the sides of the box B by means of a button, $u$, passing through the slot $v$, and keyed in place by being turned.

E represents the main kneading-roller. Its journals rest in bearings in the upper edges of the walls $b$, and are prevented from displacement by the walls $c$, which serve as caps.

On the end of one of the journals of this roller is rigidly secured the toothed wheel $d$.

F represents a small auxiliary roller, working above and parallel with the roller E.

To one end of the roller F is attached a crank, G, and to the other end is secured a toothed wheel, $e$, designed to engage with the toothed wheel $d$ of the roller E.

H designates the scraper, a flat bar, extending transversely across from side to side of the frame C. This scraper is placed above the middle of the roller E, nearly touching it, and is inclined downward toward the axial line of the roller.

Inclined grooves, $h\ h$, are formed in the opposite walls $c\ c$ of the frame C.

There may be a series of these grooves on each side, parallel to each other, and serving as a means for adjusting the inclined sliding guide-board K at any required distance from the roller E, regulated by the amount of dough to be worked. This inclined board may extend nearly or quite to the bottom of the box B.

The operation of the dough-kneader is as follows:

The flour and water are preferably first mixed. If the quantity be small, the inclined guide K is adjusted close to the roller; if it be large, the board is adjusted as far from the roller as may be necessary. The dough then having been deposited between the guide K and the roller E, all that is necessary is to turn the crank G either backward and forward, or by full revolutions, as may be most convenient, until the dough is thoroughly worked, which will usually be in about ten minutes. The frame C, with the guide K, having been removed, the dough may be readily rolled out on the bottom of the box B, the roller E being usually adjusted therefrom a sufficient distance to correspond with the required thickness of dough for rolling biscuits or rolls.

If it should be desirable, the journals of the roller E may be seated in adjustable slides, and in that case it can be used for rolling any thickness of dough, with this advantage, that the dough will be always evenly spread.

In the kneading operation the inclined guide K serves an important purpose in keeping the dough up to the roller.

What I claim as new, and desire to secure by Letters Patent, is—

1. In a dough-kneader, the combination of the roller E with the adjustable guide-board K and box A, provided with parallel adjusting-grooves, $h\ h$, substantially as specified.

2. In a dough-kneader, the combination of the roller E with the box A, inclined guide K, small roller F, and scraper H, substantially as herein shown and described.

In testimony that I claim the above I have hereunto subscribed my name in the presence of two witnesses.

HERBERT HENRY HAWES.

Witnesses:
EDWARD ISAIAH JONES,
THORNTON GEORGE STOUT.